(12) United States Patent
Marlia et al.

(10) Patent No.: US 10,683,684 B2
(45) Date of Patent: Jun. 16, 2020

(54) MOTOR VEHICLE CLOSURE SYSTEM WITH ELECTRONIC LATCH AND HANDLE HAVING TWO-PIN HANDLE SWITCH

(71) Applicant: Magna Closures Inc., Newmarket (CA)

(72) Inventors: Marco Marlia, Pisa (IT); Marco Bartalucci, Castelfranco di Sotto (IT); Claudio Cambini, Florence (IT)

(73) Assignee: MAGNA CLOSURES INC., Newmarket, Ontario (CA)

(*) Notice: Subject to any disclaimer, the term of this patent is extended or adjusted under 35 U.S.C. 154(b) by 445 days.

(21) Appl. No.: 15/484,433

(22) Filed: Apr. 11, 2017

(65) Prior Publication Data

US 2017/0314302 A1    Nov. 2, 2017

Related U.S. Application Data

(60) Provisional application No. 62/329,278, filed on Apr. 29, 2016.

(51) Int. Cl.
| | |
|---|---|
| *E05B 81/76* | (2014.01) |
| *B60R 16/00* | (2006.01) |
| *E05B 81/80* | (2014.01) |
| *H02H 9/04* | (2006.01) |

(52) U.S. Cl.
CPC ............ *E05B 81/76* (2013.01); *B60R 16/005* (2013.01); *E05B 81/80* (2013.01); *H02H 9/045* (2013.01)

(58) Field of Classification Search
CPC ......... E05B 81/76; E05B 81/80; H02H 9/045; B60R 16/005
USPC .......................................................... 701/49
See application file for complete search history.

(56) References Cited

U.S. PATENT DOCUMENTS

| | | | | |
|---|---|---|---|---|
| 2004/0099233 A1* | 5/2004 | Fujimoto | ................. | F02D 41/06 123/142.5 R |
| 2004/0104345 A1* | 6/2004 | Kansakoski | ....... | G01N 21/3504 250/338.5 |
| 2007/0170795 A1* | 7/2007 | Yokomori | ............... | H02K 23/66 310/77 |
| 2011/0291799 A1* | 12/2011 | Girard, III | ......... | G07C 9/00309 340/5.72 |
| 2015/0088354 A1* | 3/2015 | Kanayama | ............. | G01R 27/02 701/22 |
| 2015/0330111 A1 | 11/2015 | Dente et al. | | |

(Continued)

*Primary Examiner* — Khoi H Tran
*Assistant Examiner* — Rodney P King
(74) *Attorney, Agent, or Firm* — Dickinson Wright PLLC

(57) ABSTRACT

An electronic latch for a motor vehicle closure system with an electronic control circuit including a handle switch reading circuit for a two-pin handle switch and a method of operating the handle switch reading circuit are disclosed. The electronic control circuit includes a control unit. The handle switch reading circuit is controlled by the control unit for coupling with a handle switch subassembly. The handle switch reading circuit is adapted to supply an AC voltage to the handle switch subassembly and produce an output voltage waveform corresponding to the charging and discharging of a handle capacitor of the handle switch subassembly and in response to a handle switch of the handle switch subassembly being operated. The handle switch reading circuit determines a position of the handle switch and presence of faults in the handle switch reading circuit and the handle switch subassembly based on the output voltage waveform.

20 Claims, 18 Drawing Sheets

(56) References Cited

U.S. PATENT DOCUMENTS

2015/0330116 A1* 11/2015 Dente .................... B60L 58/12
                                                        307/10.1
2017/0008410 A1*  1/2017 Krammer .............. B60L 53/305
2017/0152687 A1*  6/2017 Koizumi ................ E05B 81/77

* cited by examiner

| Handle Status | Handle Switch Status | Sample 1 @Vbatt=13V | Sample 2 @Vbatt=13V | Microcontroller Action |
|---|---|---|---|---|
| Handle Pulled | No Fault | 2,3V | 2,3V | Both samples are equal to each other and to indicated value: microcontroller detects that no fault is occurred. User is authorized to release the door. |
| Handle Not Pulled | No Fault Condition | 285mV | <40mV | Sample 1 is equal to indicated value and sample 2 is less than established threshold: microcontroller detects that no fault is occurred. No action is taken |
| Handle Not Pulled | Failure 1 Short COM-Vbatt | 4V | 4V | Both samples are equal to each other and to indicated value: microcontroller detects that Failure 1 is occurred. Fault is reported to user |
| Handle Not Pulled | Failure 2 Short COM-GND | 0 | 0 | Both samples are equal to 0: microcontroller detects that a fault is occurred. Fault is reported to user |
| Handle Not Pulled | Failure 3 Short NO-Vbatt | 0 | 0 | Both samples are equal to 0: microcontroller detects that a fault is occurred. Fault is reported to user |
| Handle Not Pulled | Failure 4 Short NO-GND | 0 | 0 | Both samples are equal to 0: microcontroller detects that a fault is occurred. Fault is reported to user |
| Handle Not Pulled | Failure 5 Short NO-COM | 2,8V | 2,8V | Both samples are equal to each other and to indicated value: microcontroller detects that a fault is occurred. Fault is reported to user |
| Handle Not Pulled | Failure 6 NO/COM Broken | 0 | 0 | Both samples are equal to 0: microcontroller detects that a fault is occurred. Fault is reported to user |
| Handle Not Pulled | Failure 7 Cap Broken in short circuit | 1,6 | 1,6 | Both samples are equal to each other and to indicated value: microcontroller detects that Failure 1 is occurred. Fault is reported to user |

FIG. 7

| Failure Modes (87) | Hazard Description | ASIL* |
|---|---|---|
| Not Request handle Activation (81) | Unwanted Door Opening | ASIL A |
| | | |
| | | |
| Handle activation Request doesn't work (6) | Door does not open from INTERNAL (2) | ASIL A |
| | Door does not open from EXTERNAL (2) | QM |
| | Door does not open (2) | ASIL A |

*Highest Requirement

| Fault Modes | Hazard Description | Detectable | Detectable |
|---|---|---|---|
| Short COM_VBAT | Unwanted Door Opening | Yes | Yes |
| Short NC_VBAT | | Yes | na |
| Short NO_NC | | Yes | na |
| Short NO_COM | | Yes | Yes |
| Short COM_GND | Door does not open from INT/EXT | Yes | Yes |
| Short NO_GND | | Yes | na |
| Short NC_COM | | Yes | na |
| COM/wire_Broken | | Yes | Yes |
| No/wire_Broken | | Yes | Yes |
| Short NC_GND | Door does not open | Yes | na |
| Short NO_VBAT | | Yes | Yes |
| NC/wire_Broken | | Yes | na |
| Open NC_COM | | Yes | na |
| Open NO_COM | | Yes | Yes |

FIG. 17

MOTOR VEHICLE CLOSURE SYSTEM WITH ELECTRONIC LATCH AND HANDLE HAVING TWO-PIN HANDLE SWITCH

CROSS REFERENCE TO RELATED APPLICATION

This application claims the benefit of U.S. Provisional Application Ser. No. 62/329,278 filed Apr. 29, 2016, which is incorporated herein by reference in its entirety.

FIELD

The present disclosure relates generally to an electronic latch (commonly known as an e-latch) for a motor vehicle closure system with a handle switch reading circuit for a two-pin handle switch and a method of operating the handle switch reading circuit.

BACKGROUND

This section provides background information related to the present disclosure which is not necessarily prior art.

In the following description and the accompanying claims, the expression "closure device" will be used to generally indicate any element movable between an open position and a shut position, respectively opening and closing an access to an inner compartment of a motor vehicle, therefore including, boot, rear hatches, bonnet lid or other closed compartments, window regulators, sunroofs, in addition to the side doors of a motor vehicle, to which the following description will make explicit reference, purely by way of example.

It is known that electrical latches are provided in motor vehicles, for example for controlling opening and closing of the side doors.

An electrical door latch generally includes a latch mechanism having a ratchet that is selectively rotatable with respect to a striker fixed to a door post in order to latch and unlatch the door. The latch mechanism also includes a pawl that selectively engages the ratchet to prevent the ratchet from rotating. The electrical door latch includes an electric motor, which is electrically connected to a main electric power supply of the vehicle (for example to the 12V battery of the same vehicle), in order to directly or indirectly drive the pawl, via an electrically-operated latch release actuator.

As it is known, a common problem related to electrical latches is that of controlling, as it is also required by security regulations, the opening and closing of the doors even in case of failure of the main power supply of the vehicle, or in case of interruptions or breaking of the electrical connection between the main power supply and the electric motor in the latch; this kind of situation may occur for example in case of an accident or crash involving the vehicle.

Additionally, the use of electrical door latches leads to the use of door handle switches or sensors to determine, for example, the position of the handle or handle activation (i.e., has the handle been pulled or not). These handle switches may connect to control circuitry or control units associated with the electronic latch via a wired connection. However, such door switches can experience failures and/or wiring connected to the switches may fail or become shorted to ground, or to other wires, such as wires carrying vehicle battery voltage. Failures associated with the handle switch and/or associated wiring can, for example, can trap occupants of the vehicle (e.g., door handle movement is not properly detected) and/or lead to spontaneous release of the electronic latch or door opening (e.g., the switch state is erroneously read due to an issue in the wiring to the door handle switch). Known solutions for diagnosing door switch issues are generally incapable of detecting all possible dangerous failure modes and/or utilize complicated detection schemes.

A need therefore exists in the field for an improved circuit for operating a handle switch and diagnostics of the handle switch and a method of operating the circuit.

SUMMARY

This section provides a general summary of the present disclosure and is not intended to be interpreted as a comprehensive disclosure of its full scope or all of its features, aspects and objectives.

Accordingly, it is an aspect of the present disclosure to provide an electronic control circuit for an e-latch assembly. The electronic control circuit includes a control unit including a computing module and a memory for communicating with plurality of sensors and connects to a main power source. A handle switch reading circuit is connected to and controlled by the control unit and connects to the main power source. The handle switch reading circuit has a normally open node and common node for coupling with a handle switch subassembly that has a handle switch for connecting the normally open node and the common node and a handle capacitor in parallel with the handle switch. The handle switch reading circuit is adapted to supply an AC voltage to the handle switch subassembly. Additionally, the handle switch reading circuit is adapted to produce an output voltage waveform at the common node corresponding to the charging and discharging of the handle capacitor and in response to the handle switch being operated. Finally, the handle switch reading circuit is adapted to determine a position of the handle switch and presence of faults in the handle switch reading circuit and the handle switch subassembly based on the output voltage waveform.

According to another aspect of the disclosure, a handle switch reading circuit for an e-latch assembly is provided. The handle switch reading circuit includes at least one input node and an output node for connection to a control unit. The handle switch reading circuit also includes a main power node for connection to a main power source and a ground node for connection to a ground and a normally open node and a common node for connection to a handle switch subassembly. Additionally, the handle switch reading circuit includes a DC-to-AC converter connected to one of the at least one input nodes and the main power node and including a converter output node for converting a DC voltage from the main power source to an AC voltage output at the converter output node. A series capacitor is connected between the common node and the ground node. The common node is coupled to the output node for providing an output waveform to the control unit at the output node to determine a position of a handle switch of the handle switch subassembly and any faults present in the switch reading circuit.

According to yet another aspect of the disclosure, a method of operating a switch reading circuit for an e-latch assembly is provided. The method includes the step of generating an AC voltage from a DC voltage. Next, supplying the AC voltage to a handle switch subassembly. The method continues by producing an output voltage waveform corresponding to the charging and discharging of a handle capacitor of the handle switch subassembly and in response to a handle switch being operated. The next step of the method is sampling the output voltage waveform using a control unit. The method concludes with determining a position of the handle switch of the handle switch subassembly and any faults present in the switch reading circuit based on the sampling of the output voltage waveform.

These and other aspects and areas of applicability will become apparent from the description provided herein. The description and specific examples in this summary are intended for purpose of illustration only and are not intended to limit the scope of the present disclosure.

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which:

FIG. 7 is a chart illustrating a plurality of detectable faults and associated samples of the output voltage waveform to the control unit of the electronic control circuit of FIG. 2 and corresponding action of the microcontroller for each detectable fault;

FIG. 17 illustrates charts showing a plurality of failure modes, associated hazard descriptions and whether the failure modes are detectable.

DESCRIPTION OF THE ENABLING EMBODIMENT

In the following description, details are set forth to provide an understanding of the present disclosure. In some instances, certain circuits, structures and techniques have not been described or shown in detail in order not to obscure the disclosure.

In general, the present disclosure relates to a power-operated device of the type well-suited for use in many applications. More specifically, an electronic latch for a motor vehicle closure system having a handle switch reading circuit for a two-pin handle switch and a method of operating the handle switch reading circuit are disclosed herein. The electronic control circuit for the electronic latch assembly of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

Figure 1:
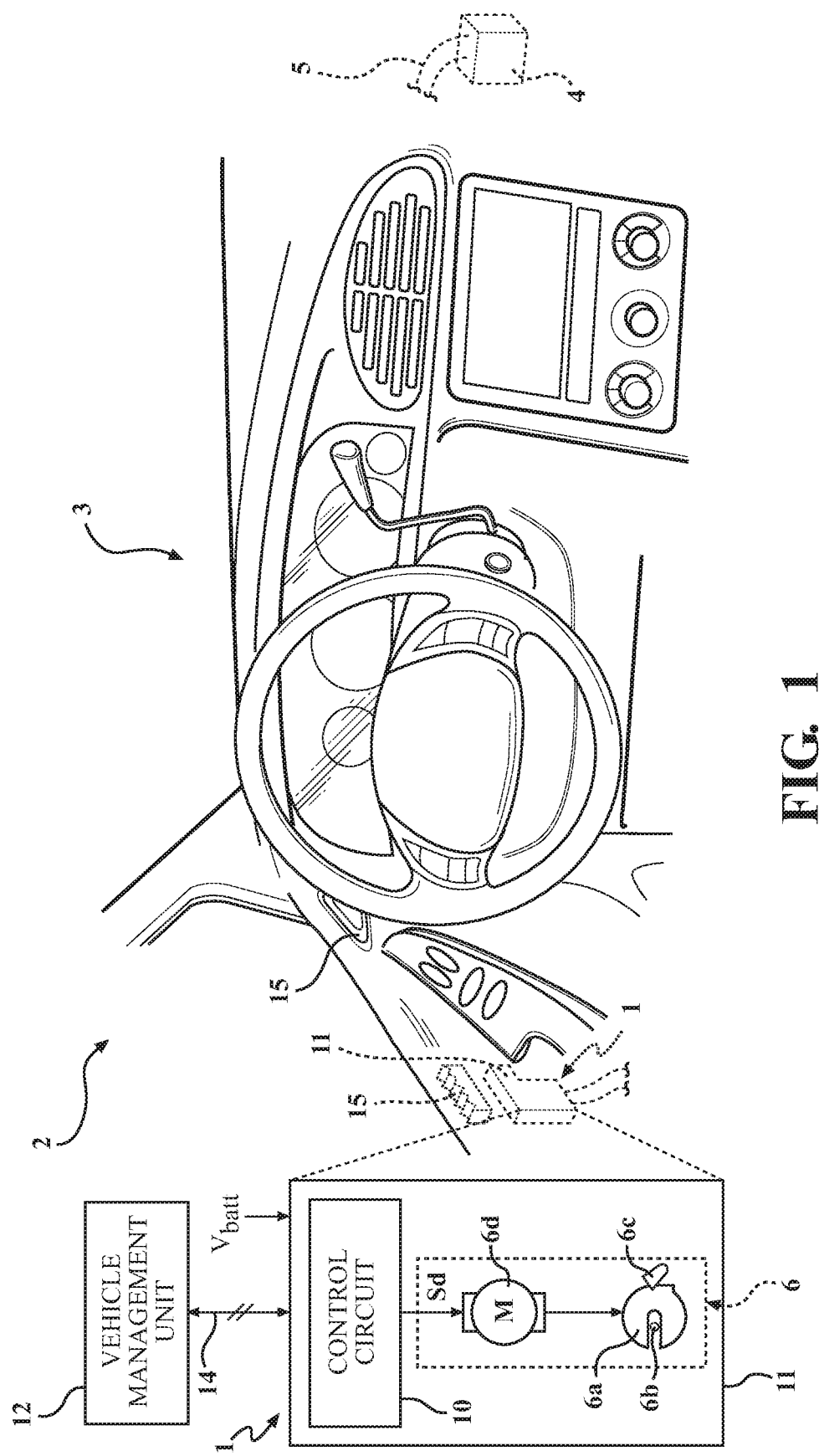
FIG. 1 is a schematic representation of a motor vehicle with a closure device and a related e-latch assembly according to an aspect of the disclosure.

Referring to the Figures, wherein like numerals indicate corresponding parts throughout the several views, number 1 in FIG. 1 indicates, as a whole, an electronic latch assembly (hereinafter e-latch assembly 1), coupled to a side door 2 of a motor vehicle 3 (however, it should be understood that the e-latch assembly 1 may equally be coupled to any kind of closure device of the motor vehicle 3).

The e-latch assembly 1 is electrically connected to a main power source 4 of the motor vehicle 3, for example a main battery providing a battery voltage $V_{batt}$ of 12 V, through an electrical connection element 5, for example a power cable (the main power source 4 may equally include a different source of electrical energy within the motor vehicle 3, for example an alternator).

The e-latch assembly 1 includes an actuation group 6, including an electric motor 6d, operable to control actuation of the door 2 (or in general of the vehicle closure device).

In a possible embodiment, the actuation group 6 includes a latch mechanism having a ratchet 6a which is selectively rotatable to engage a striker 6b (fixed to the body of the motor vehicle 3, for example to the so called "A pillar" or "B pillar", in a manner not shown in detail). When the ratchet 6a is rotated into a latching position with respect to the striker 6b, the side door 2 is in a closed operating state. A pawl 6c, also associated with the latch mechanism, selectively engages the ratchet 6a to prevent it from rotating, driven by an electric motor 6d so as to move between an engaged position and a non-engaged position.

The e-latch assembly 1 further includes an electronic control circuit 10, for example including a microcontroller or other known computing unit, which may be conveniently embedded and arranged in a same housing or case 11 (shown schematically) with the actuation group 6 of the e-latch assembly 1, thus providing an integrated compact and easy-to-assemble unit.

The electronic control circuit 10 is coupled to the electric motor 6d and provides driving signals $S_d$ thereto. The electronic control circuit 10 is also electrically coupled to a main vehicle management unit 12 (also known as main ECU or "vehicle body computer"), which is configured to control general operation of the motor vehicle 3, via a data bus 14, so as to exchange signals, data, commands and/or information.

The vehicle management unit 12 is also coupled to crash sensors 13, for example accelerometer or force sensors, which provide signals, for example acceleration or force signals, which indicate the presence of an emergency situation, such as a crash.

Conveniently, the electronic control circuit 10 also receives feedback information about the latch actuation from position sensors (not shown), such as Hall sensors, configured to detect the operating position, for example of the ratchet 6a and/or pawl 6c; and also receives (directly and/or indirectly via the vehicle management unit 12) information about the actuation of the vehicle handles 15 (external and/or internal) from a handle switch subassembly 16, which detects user activation of the internal and/or external handles 15 of the doors of the motor vehicle 3.

The electronic control circuit 10 is also coupled to the main power source 4 of the motor vehicle 3, so as to receive the battery voltage $V_{batt}$; the electronic control circuit 10 is thus able to check if the value of the battery voltage $V_{batt}$ decreases below a predetermined threshold value, to promptly determine if an emergency condition (when a backup energy source may be needed) occurs.

Figure 2:
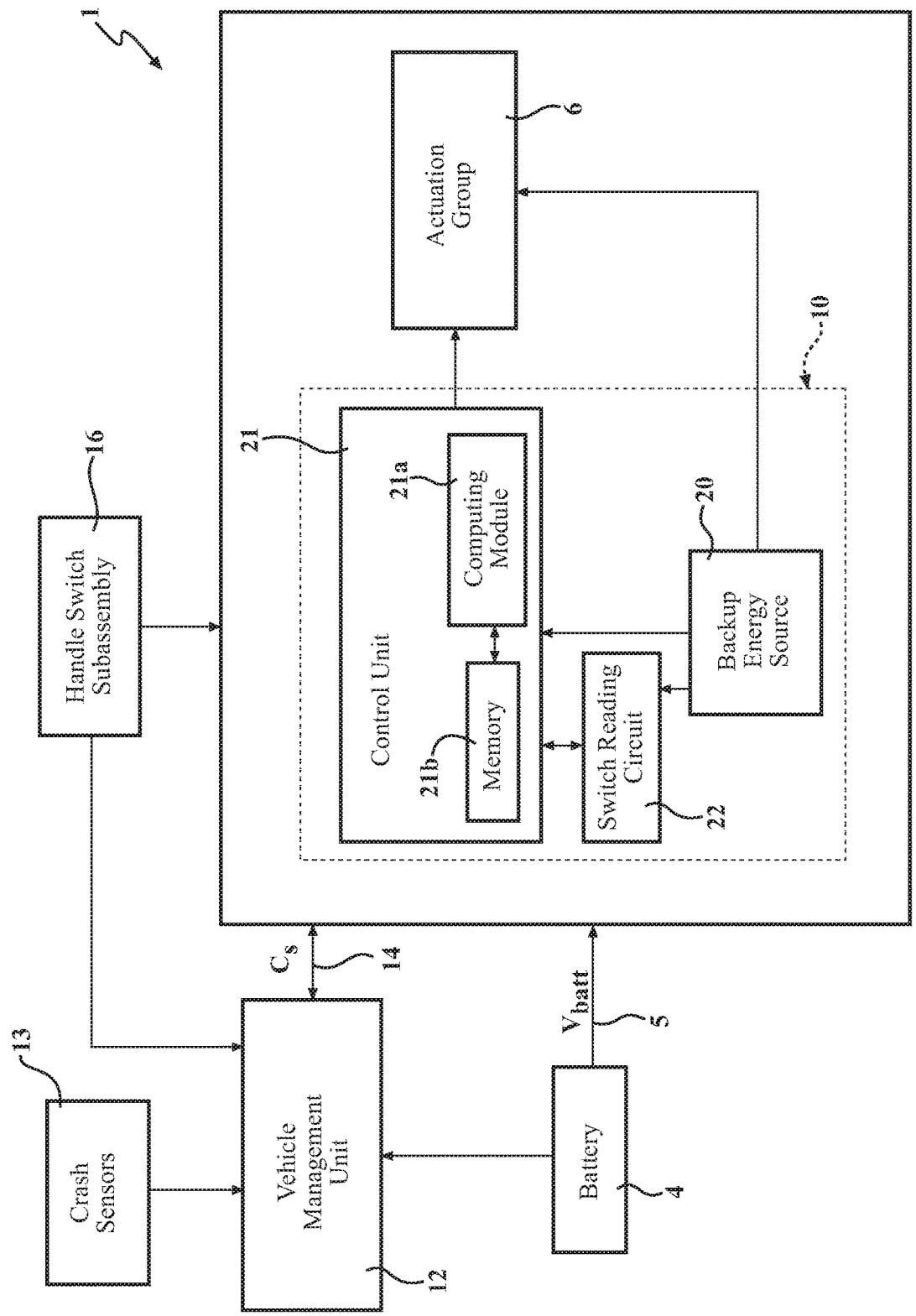
FIG. 2 is a general block diagram of an electronic control circuit of the e-latch assembly of FIG. 1 according to an aspect of the disclosure.

As shown in the schematic block diagram of FIG. 2, the electronic control circuit 10 includes an embedded and integrated backup energy source 20, which is configured to supply electrical energy to the actuation group 6 and latch electric motor 6d, and to the same electronic control circuit 10, in case of failure or interruption of the main power supply from the main power source 4 of the motor vehicle 3.

This backup energy source 20 is usually kept in a charged state during normal operation, by the main power source 4, so as to be readily available as soon as the need arises, for example, in case of a crash.

In more detail, the electronic control circuit 10 includes a control unit 21, for example provided with a microcontroller, microprocessor or analogous computing module 21a, coupled to the backup energy source 20 and the actuation group 6 of the e-latch assembly 1, to control their operation.

The control unit 21 has an embedded memory 21b, for example a non-volatile random access memory 21b, coupled to the computing module 21a, storing suitable programs and computer instructions (for example in the form of a firmware). It is recognized that the control unit 21 may alternatively comprise a logical circuit of discrete components to carry out the functions of the computing module 21a and memory 21b.

In a known manner (here not discussed in detail), the control unit 21 is configured to control the e-latch assembly 1 for controlling actuation of the door 2, based on signals detected by the handle switch subassembly 16, which are indicative for example of the user intention to open the door 2 of the motor vehicle 3, and based on signals received from the vehicle management unit 12, which are indicative for example of a correct authentication of the user carrying suitable authentication means (such as in a key fob) or for indicating the occurrence of an emergency situation, such as a crash (e.g., the vehicle management unit 12 can send an emergency signal $C_s$ to the control unit 21).

Figure 3:
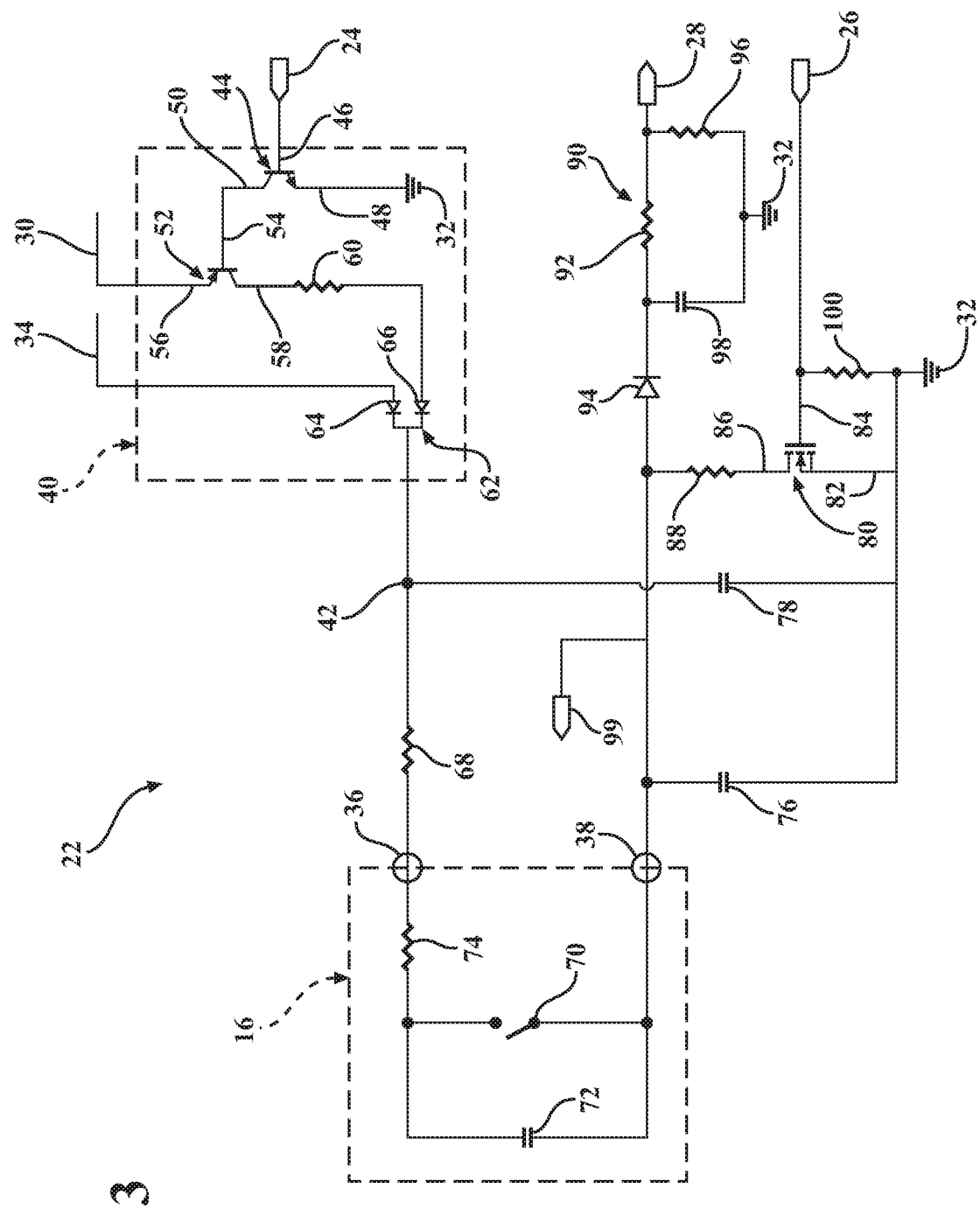
FIG. 3 is a circuit diagram of a handle switch reading circuit of the electronic control circuit of FIG. 2 according to an aspect of the disclosure.

According to an aspect of the disclosure, the electronic control circuit 10 includes a handle switch reading circuit 22, shown generally in FIG. 2 and in more detail in FIG. 3. The handle switch reading circuit 22 includes a first input node 24 and a second input node 26 and an output node 28 for connection to the control unit 21. The handle switch reading circuit 22 also includes a main power node 30 for connection to the main power source 4 and a ground node 32 for connection to a ground. Additionally, a backup power node 34 is included in the handle switch reading circuit 22 for connection to the backup energy source 20. A normally open node 36 and a common node 38 are each used for connecting to the handle switch subassembly 16.

A DC-to-AC converter 40 is connected to the first output node 28 and the main power node 30 and includes a converter output node 42 for converting a DC (direct current) voltage from the main power source 4 to an AC (alternating current) voltage output at the converter output node 42. The DC-to-AC converter 40 includes a first power switch 44 that has a first base 46 connected to the first input node 24 and a first emitter 48 connected the ground node 32 and a first collector 50. The DC-to-AC converter 40 also includes a second power switch 52 that has a second base 54 connected to the first collector 50 and a second emitter 56 connected the main power node 30 and a second collector 58. The DC-to-AC converter 40 further includes a converter resistor 60 connected to the second collector 58. The first power switch 44 and consequently the second power switch 52 can be operated by the control unit 21 through the first input node 24 (e.g., the control unit 21 can provide an alternating signal at the first input node 24 to switch the first power switch 44 to produce the AC voltage output).

Additionally, the DC-to-AC converter 40 includes a double diode 62 including a first diode 64 connected between the backup power node 34 and the converter output node 42 for preventing current flow to the backup power node 34 from the converter output node 42. The double diode 62 includes a second diode 66 connected between the converter resistor 60 and the converter output node 42 for rectifying the AC voltage and preventing current flow to the second collector 58 from the converter output node 42. A converter-to-switch resistor 68 is connected between the converter output node 42 and the normally open node 36 for providing a voltage drop.

The handle switch subassembly 16 that can couple to the handle switch reading circuit 22 includes a handle switch 70 for connecting the normally open node 36 and the common node 38 of the handle switch reading circuit 22 and a handle capacitor 72 in parallel with the handle switch 70. The capacitance of the handle capacitor 72 can, for example, be 10 nanofarads, however, it should be appreciated that the handle capacitor 72 could have a different capacitance. Preferably, the capacitance of the handle capacitor 72 is chosen to be distinguished from parasitic capacitance of the circuit (e.g., the handle switch subassembly 16 and the handle switch reading circuit 22). A handle resistor 74 is also connected between the handle switch 70 and the normally open node 36. As described in more detail below, the handle resistor 74 helps provide a voltage drop that may be used by the control unit 21 to distinguish between faults present in the handle switch reading circuit 22 and/or the handle switch subassembly 16. The handle switch 70 is operable between an opened position in response to the handle 15 being in a rest position and a closed position in response to the handle 15 being pulled.

A series capacitor 76 connects between the common node 38 and the ground node 32. A parallel capacitor 78 is connected between the converter output node 42 and the ground node 32 for providing electrostatic discharge protection. The series capacitor 76 assists in the diagnosis of faults in the handle switch reading circuit 22, discussed in more detail below.

A grounding switch 80 has a first source 82 connected to the ground node 32 and a first gate 84 connected to the second input node 26 and a first drain 86. A grounding resistor 88 is connected between the common node 38 and the first drain 86 of the grounding switch 80. The grounding switch 80 is operated by the control unit 21 using the second input node 26 (e.g., the control unit 21 providing a voltage sufficient to switch the grounding switch 80).

A voltage divider subcircuit 90 is coupled to the common node 38 and to the output node 28 for decreasing a common node output voltage at the common node 38. For example, the control unit 21 that is connected to the output node 28 of the handle switch reading circuit 22 may only be capable of accepting voltages within a specific acceptable voltage range, so the voltage divider subcircuit 90 helps reduce the common node output voltage, so as not to exceed the specific acceptable voltage range. An output diode 94 is connected between the common node 38 and the voltage divider subcircuit 90 for preventing current flow from the output node 28 to the common node 38. The voltage divider subcircuit 90 includes a first resistor 92 connected between the output diode 94 and the output node 28 and a second resistor 96 connected between the output node 28 and the ground node 32. A divider capacitor 98 is connected between the output diode 94 and the ground node 32. A trigger voltage may be measured from a trigger node 99 to start the system when it is powered by the backup energy source 20. A second input resistor 100 is connected between the second input node 26 and the ground node 32.

Figure 4A:
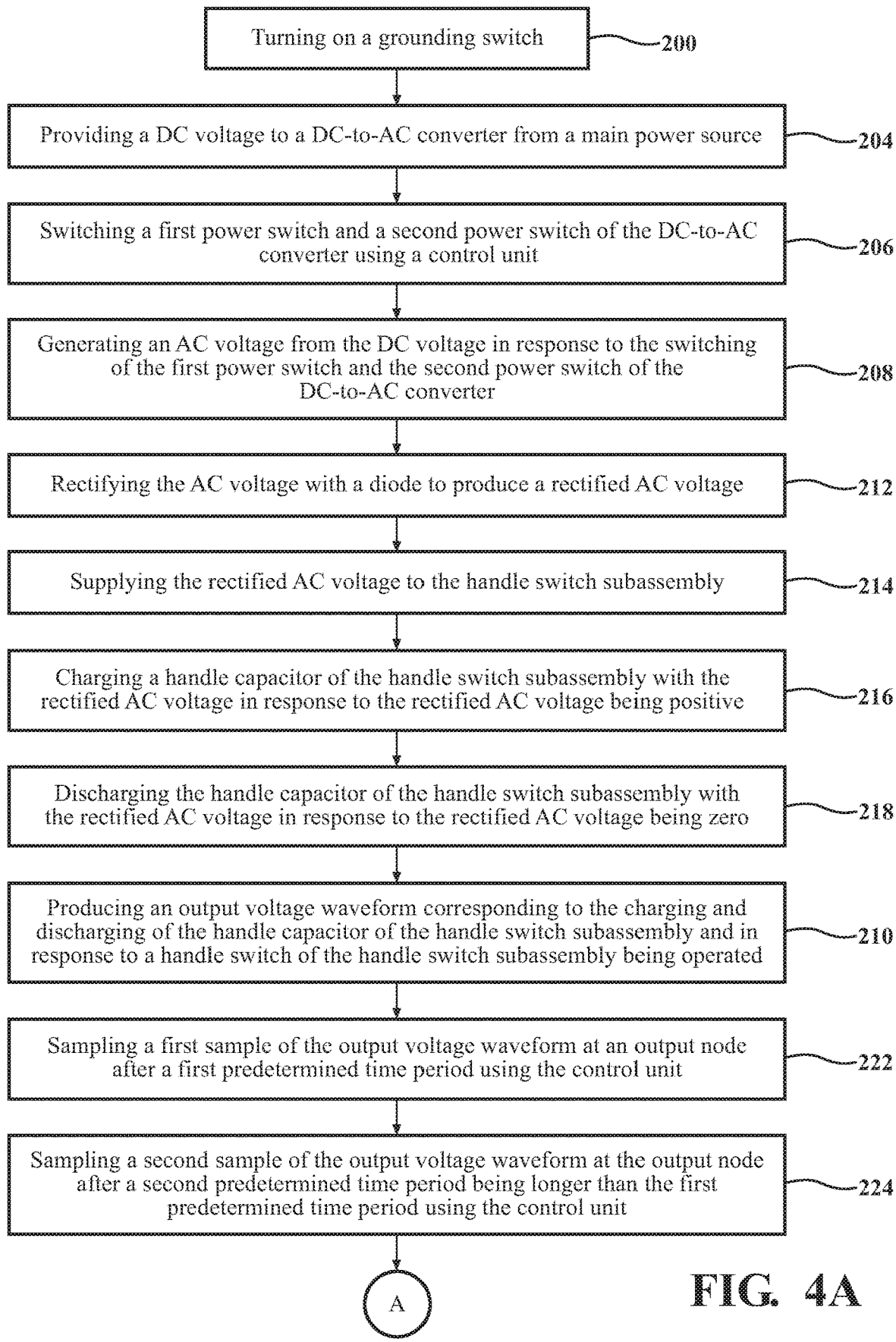
FIGS. 4A, 4B, and 5 illustrate methods of operating a handle switch reading circuit of the of the e-latch assembly according to an aspect of the disclosure
Figure 4B:
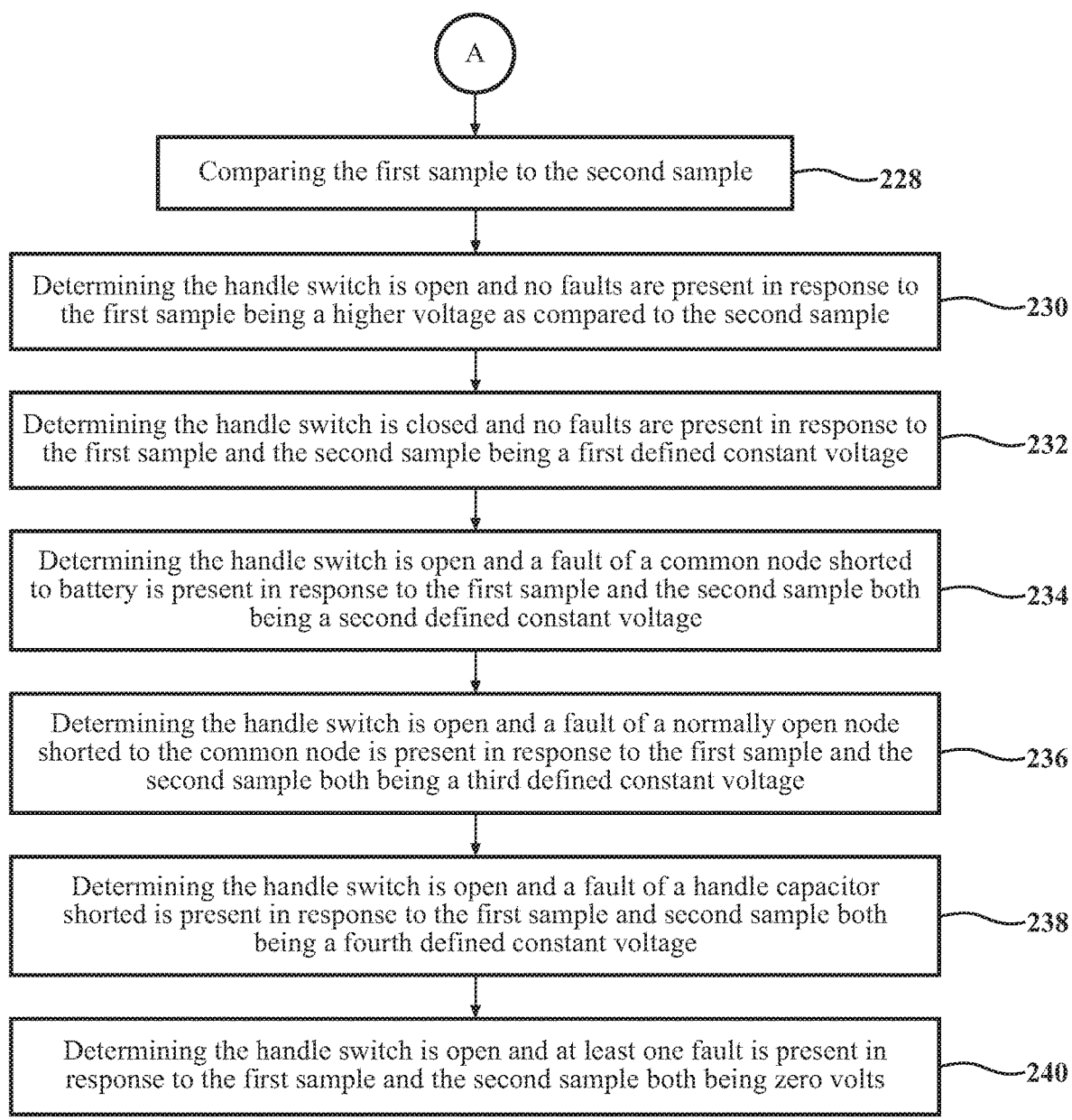
Figure 5:
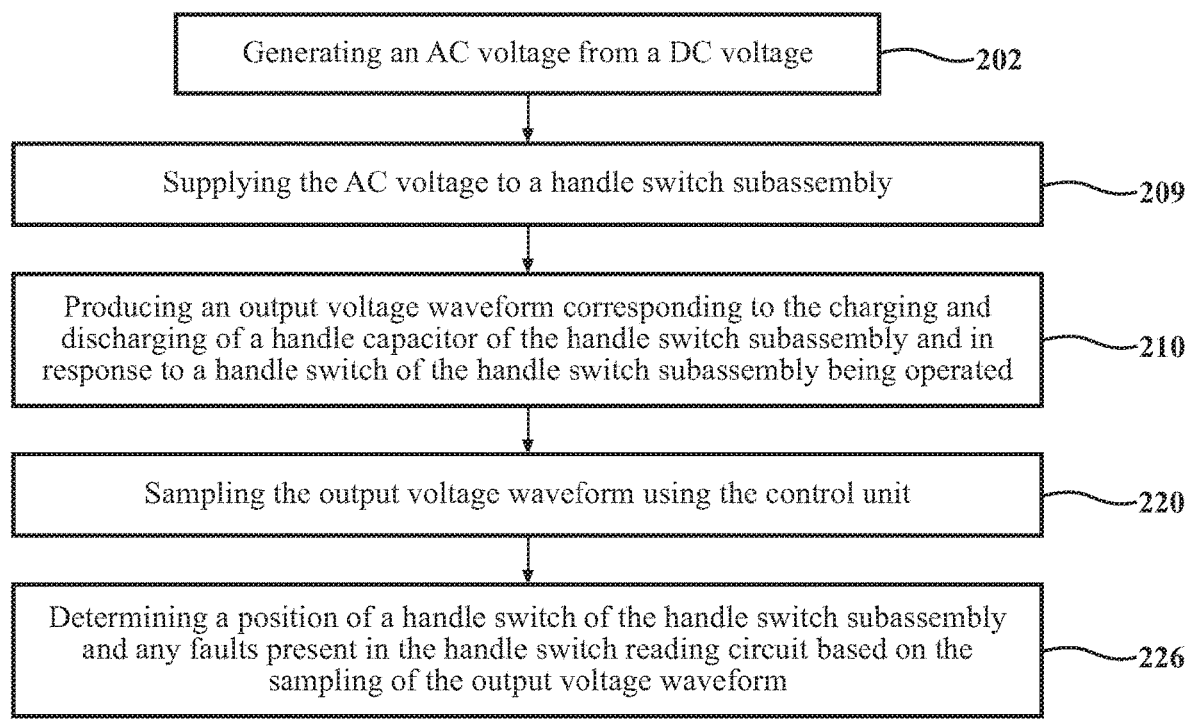

As illustrated in FIGS. 4A, 4B, and 5, a method of operating the switch reading circuit is also disclosed. The method can include the step of 200 turning on a grounding switch 80. Next, 202 generating an AC voltage from a DC voltage. This step can include 204 providing a DC voltage to a DC-to-AC converter 40 from a main power source 4. The step of 202 generating an AC voltage from a DC voltage can also include the steps of 206 switching a first power switch 44 and a second power switch 52 of the DC-to-AC converter 40 using a control unit 21 and 208 generating an AC voltage from the DC voltage in response to the switching of the first power switch 44 and the second power switch 52 of the DC-to-AC converter 40. Then, the method includes the step of 209 supplying the AC voltage to the handle switch subassembly 16.

Figure 6:
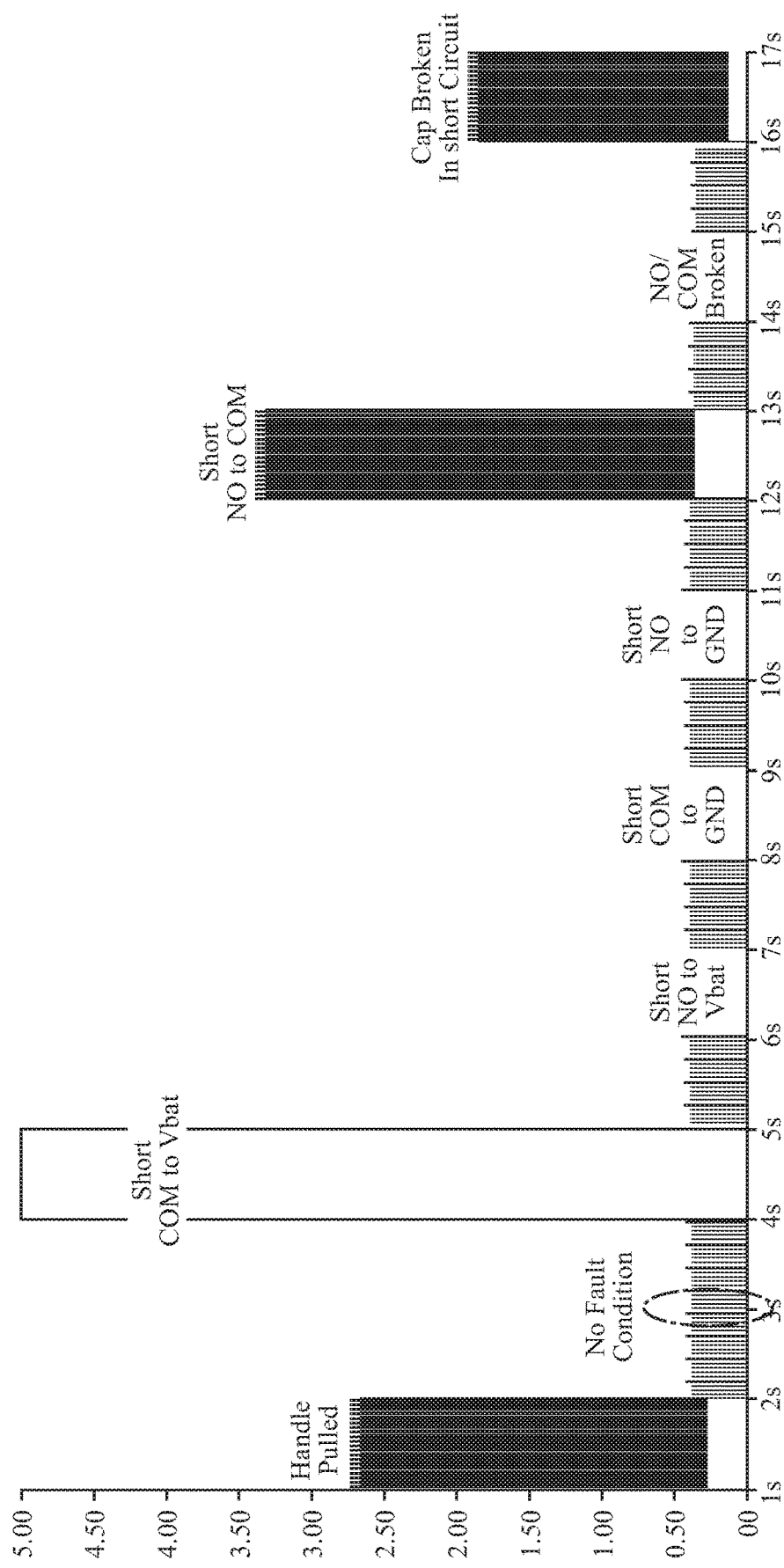
FIG. 6 is a plot of an output voltage waveform input to a control unit of the electronic control circuit of FIG. 2 illustrating the input voltage during all possible handle switch states according to aspects of the disclosure.

The method continues by 210 producing an output voltage waveform (i.e., input voltage to the control unit 21) corresponding to the charging and discharging of a handle capacitor 72 of the handle switch subassembly 16 and in response to a handle switch 70 of the handle switch subassembly 16 being operated. For example, an output voltage waveform is shown in FIG. 6 and illustrates the output voltage waveform for possible handle switch 70 positions and conditions that may occur in the handle switch reading circuit 22. The method can also include 212 rectifying the AC voltage with a diode to produce a rectified AC voltage (e.g., using the first diode 64 of the double diode 62). If so, the step of 209 supplying the AC voltage to the handle switch subassembly 16 is further defined as 214 supplying the rectified AC voltage to the handle switch subassembly 16. The step of producing an output voltage waveform also can include the steps of 216 charging a handle capacitor 72 of the handle switch subassembly 16 with the rectified AC voltage in response to the rectified AC voltage being positive and 218 discharging the handle capacitor 72 of the handle switch subassembly 16 with the rectified AC voltage in response to the rectified AC voltage being zero.

The method proceeds by 220 sampling the output voltage waveform using the control unit 21. This step can include 222 sampling a first sample of the output voltage waveform at an output node 28 after a first predetermined time period (e.g., 1 millisecond after the step of 208 generating an AC voltage from the DC voltage in response to the switching of the first power switch 44 and the second power switch 52 of the DC-to-AC converter 40) using the control unit 21. Likewise, 224 sampling a second sample of the output voltage waveform at an output node 28 after a second predetermined time period (e.g., 10 milliseconds after the step of 208 generating an AC voltage from the DC voltage in response to the switching of the first power switch 44 and the second power switch 52 of the DC-to-AC converter 40) being longer than the first predetermined time period using the control unit 21. The step of sampling the first and second samples may also be periodically repeated.

Figure 8:
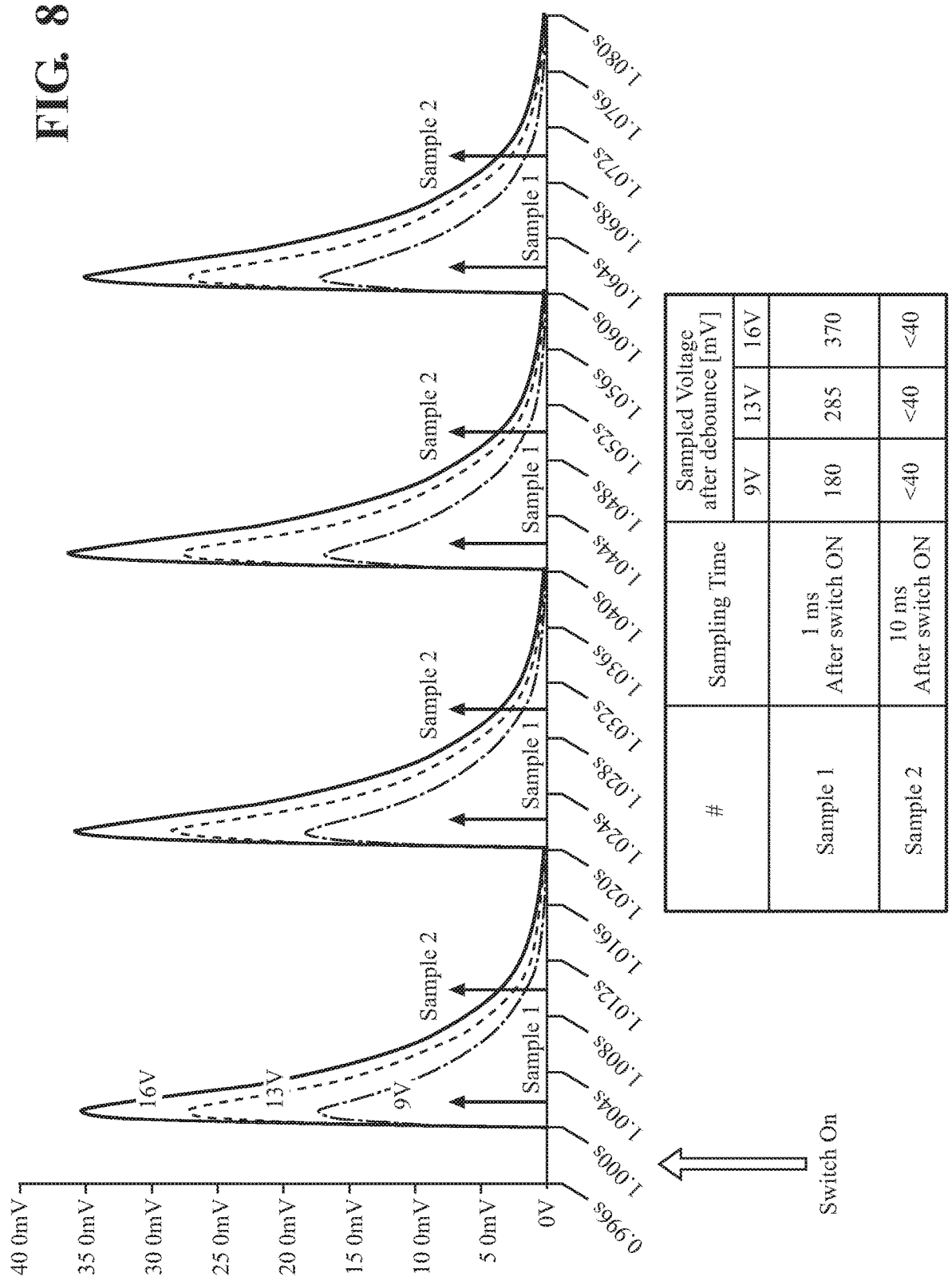
FIG. 8 is a plot of the output voltage waveform input to the control unit of the electronic control circuit of FIG. 2 illustrating the output voltage waveform with no faults present.
Figure 9:
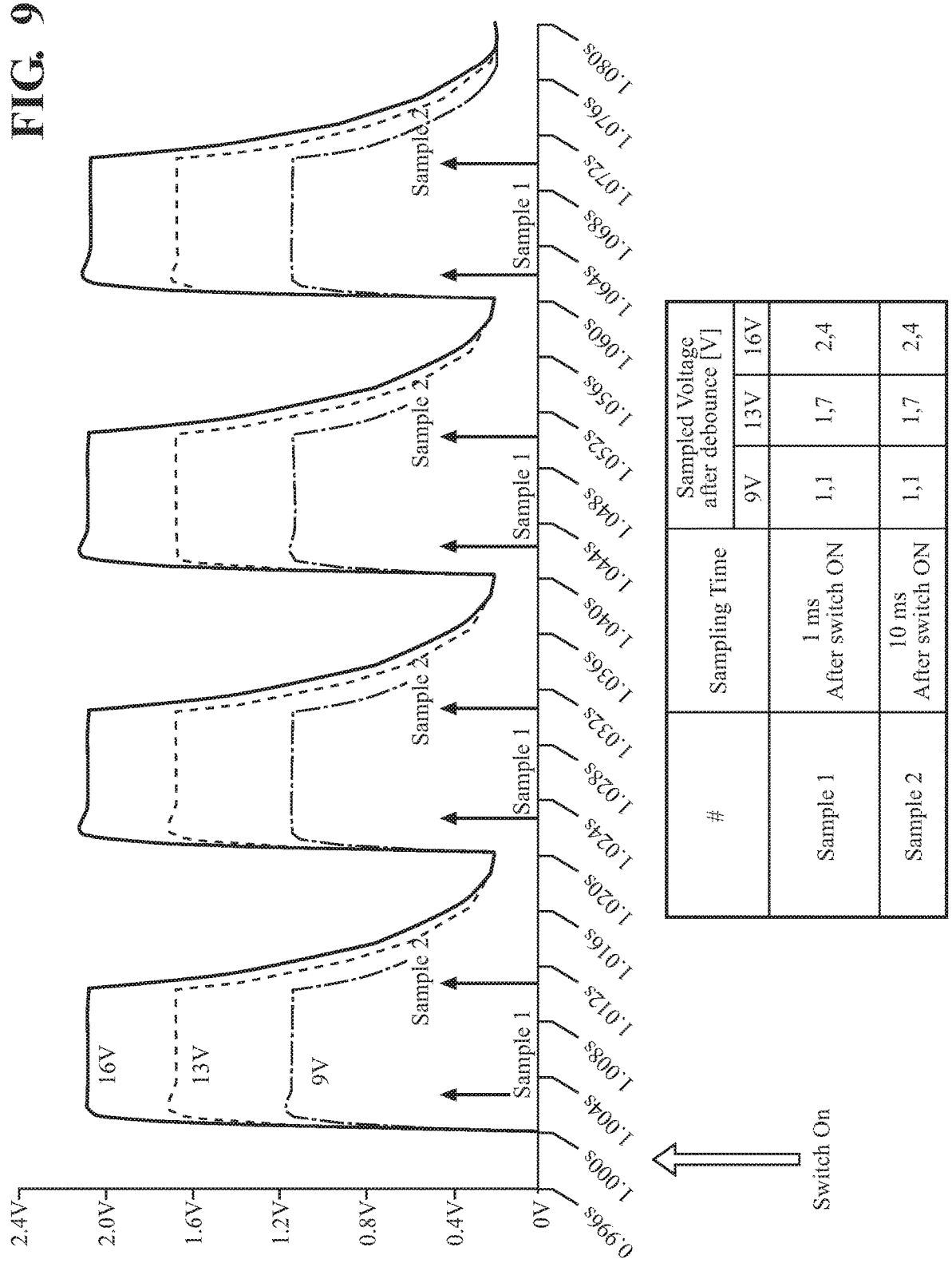
FIG. 9 is a plot of the output voltage waveform input to the control unit of the electronic control circuit of FIG. 2 illustrating the output voltage waveform with the handle pulled during a no fault condition.

The method also includes 226 determining a position of a handle switch 70 of the handle switch subassembly 16 and any faults present in the handle switch reading circuit 22 based on the sampling of the output voltage waveform. Such a step can include the step of 228 comparing the first sample to the second sample. As best shown in FIG. 7, the handle switch reading circuit 22 can detect the position of the handle switch 70 and possible faults that may occur with the handle switch reading circuit 22 and/or the handle switch subassembly 16. The step of 226 determining a position of a handle switch 70 of the handle switch subassembly 16 and any faults present in the handle switch reading circuit 22 based on the sampling of the output voltage waveform can also include 230 determining the handle switch 70 is open (i.e., handle 15 is not pulled) and no faults are present in response to the first sample being a higher voltage as compared to the second sample (FIG. 8). Similarly, the method can include 232 determining the handle switch 70 is closed (i.e., handle 15 is pulled) and no faults are present in response to the first sample and the second sample being a first defined constant voltage, 2.3 V for example (FIG. 9).

Figure 10:
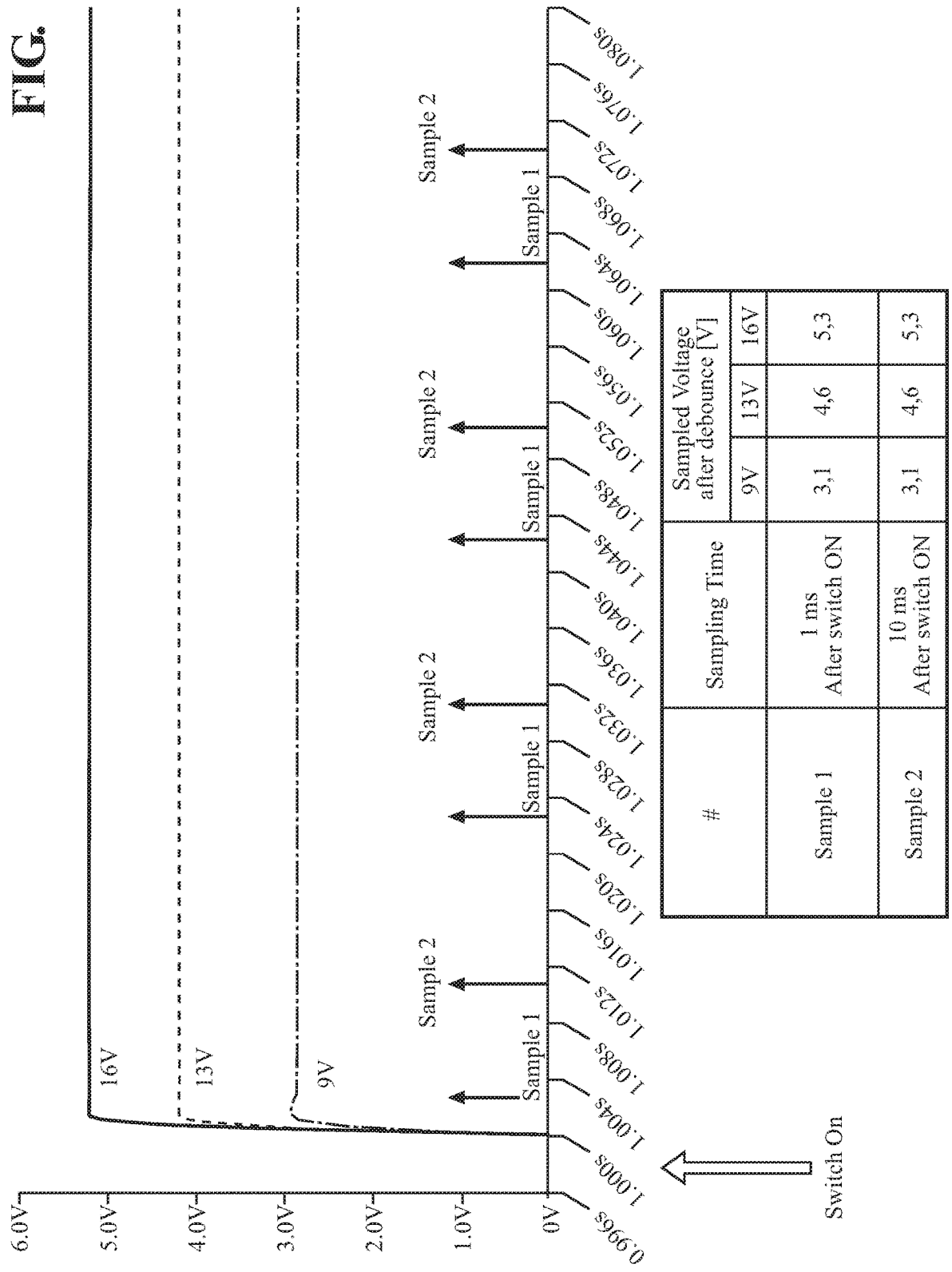
FIG. 10 is a plot of the output voltage waveform input to the control unit of the electronic control circuit of FIG. 2 illustrating the output voltage waveform with a common pin shorted to battery.
Figure 11:
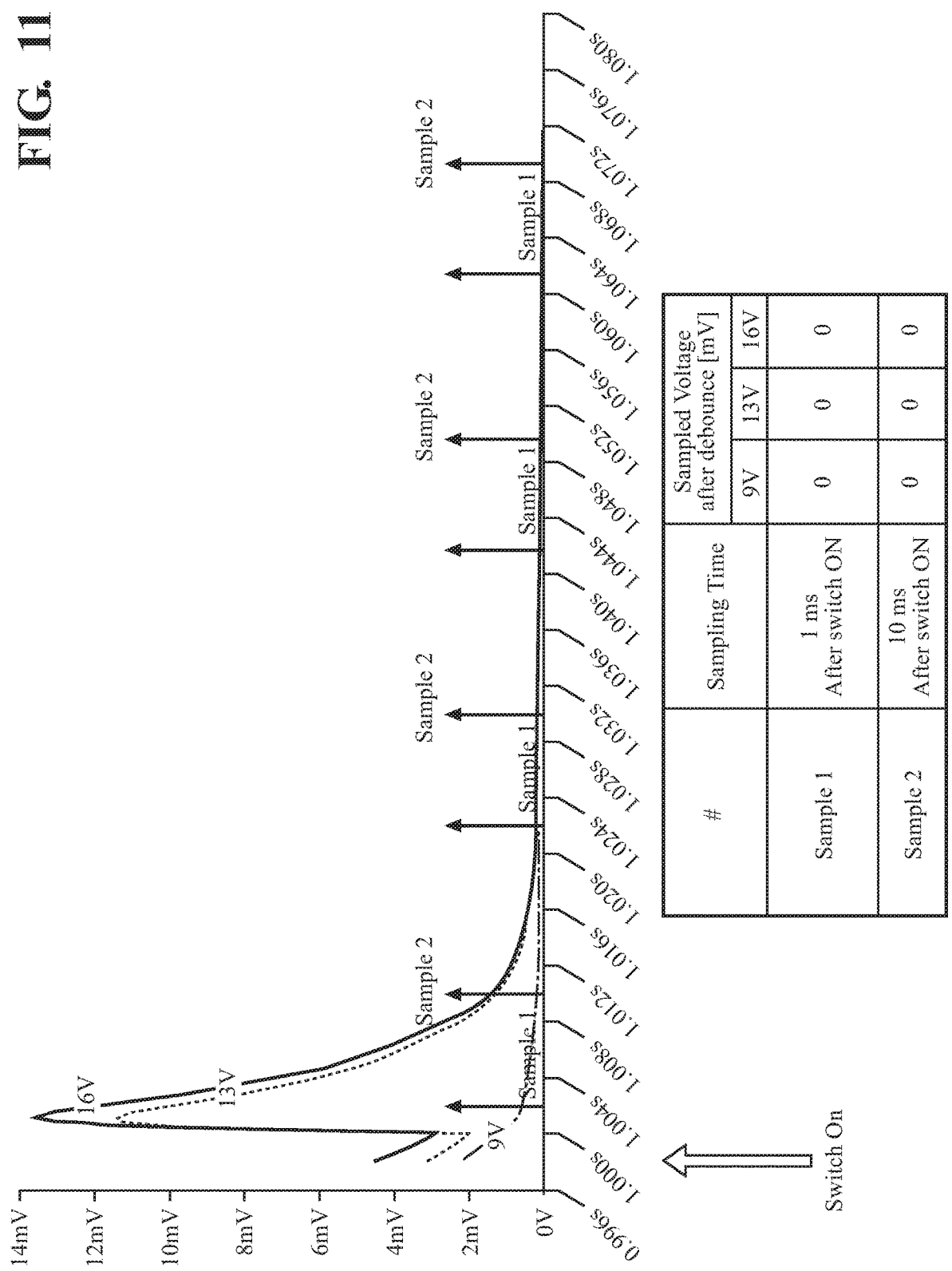
FIG. 11 is a plot of the output voltage waveform input to the control unit of the electronic control circuit of FIG. 2 illustrating the output voltage waveform with the common pin shorted to ground.
Figure 12:
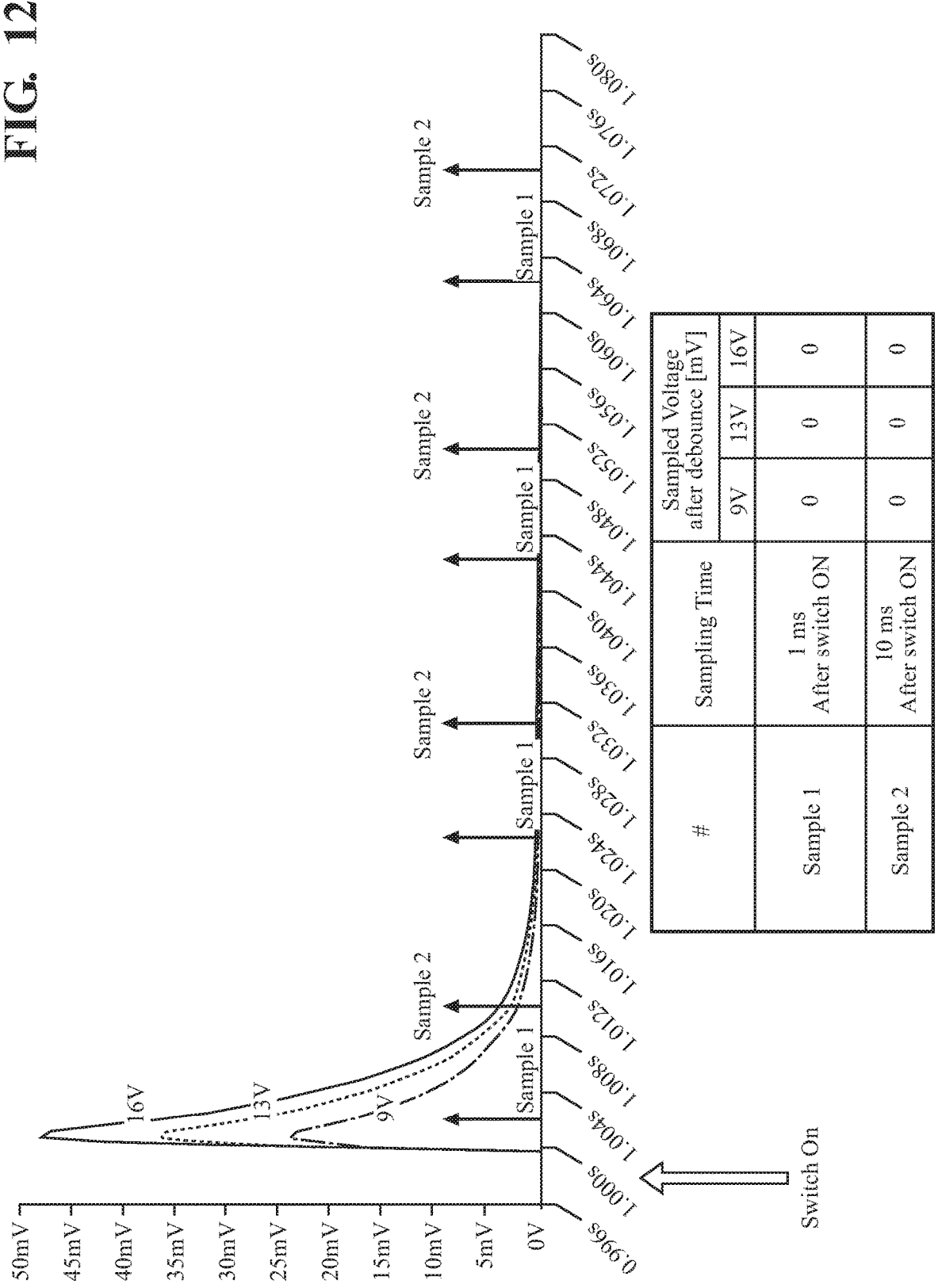
FIG. 12 is a plot of the output voltage waveform input to the control unit of the electronic control circuit of FIG. 2 illustrating the output voltage waveform with a normally open pin shorted to battery.
Figure 13:
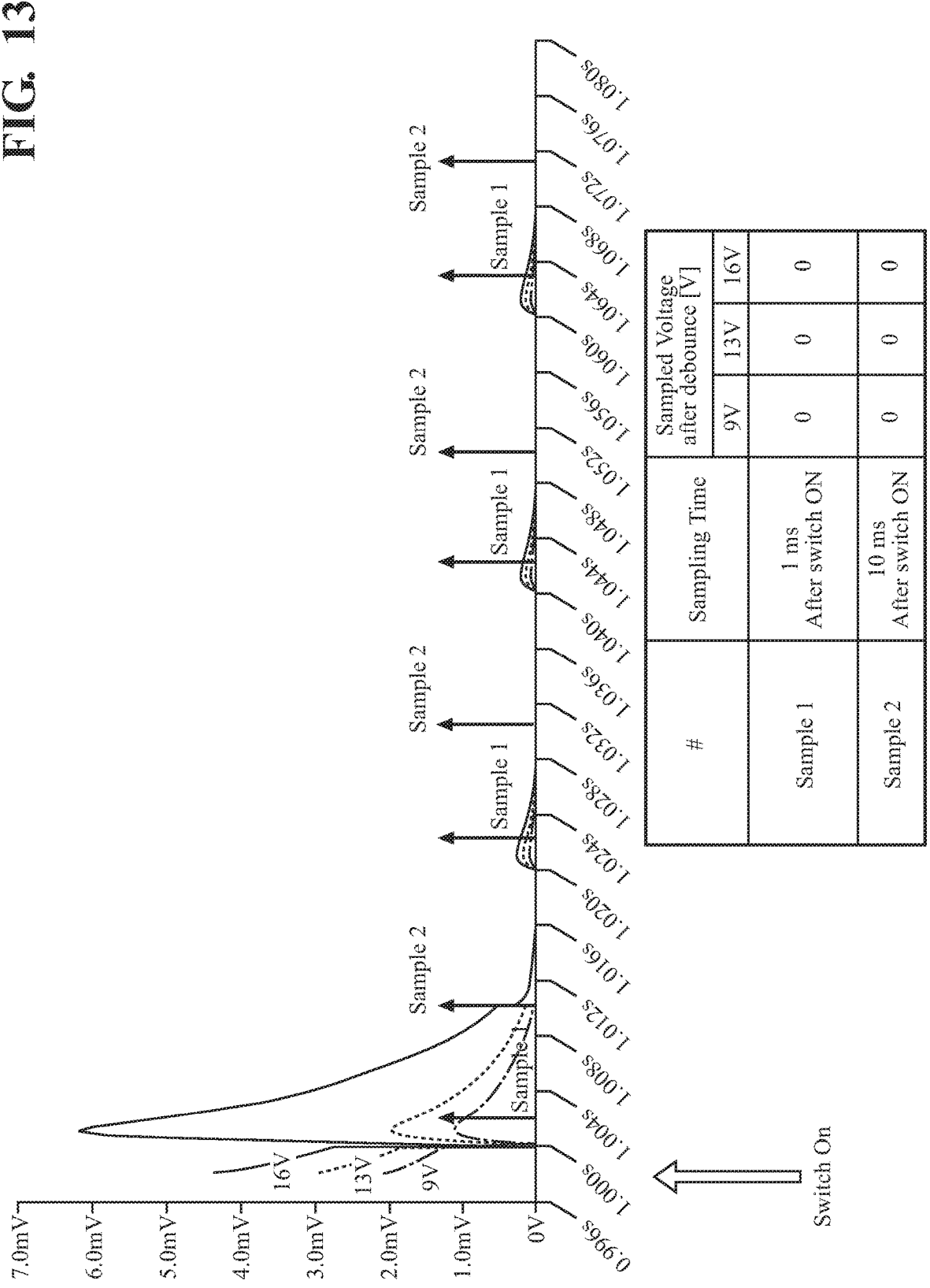
FIG. 13 is a plot of the output voltage waveform input to the control unit of the electronic control circuit of FIG. 2 illustrating the output voltage waveform with the normally open pin shorted to ground.
Figure 14:
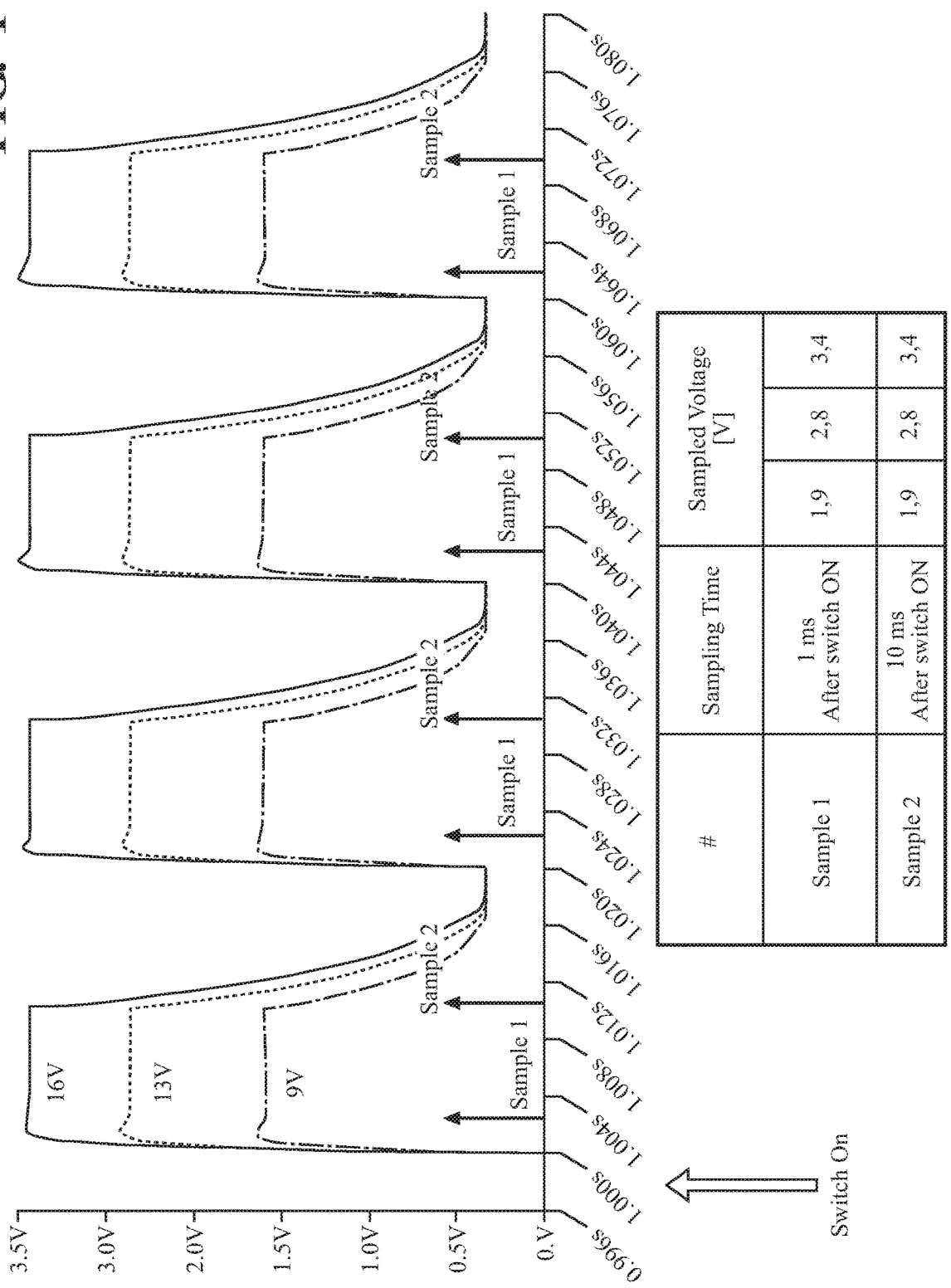
FIG. 14 is a plot of the output voltage waveform input to the control unit of the electronic control circuit of FIG. 2 illustrating the output voltage waveform with the normally open pin shorted to the common pin.
Figure 15:
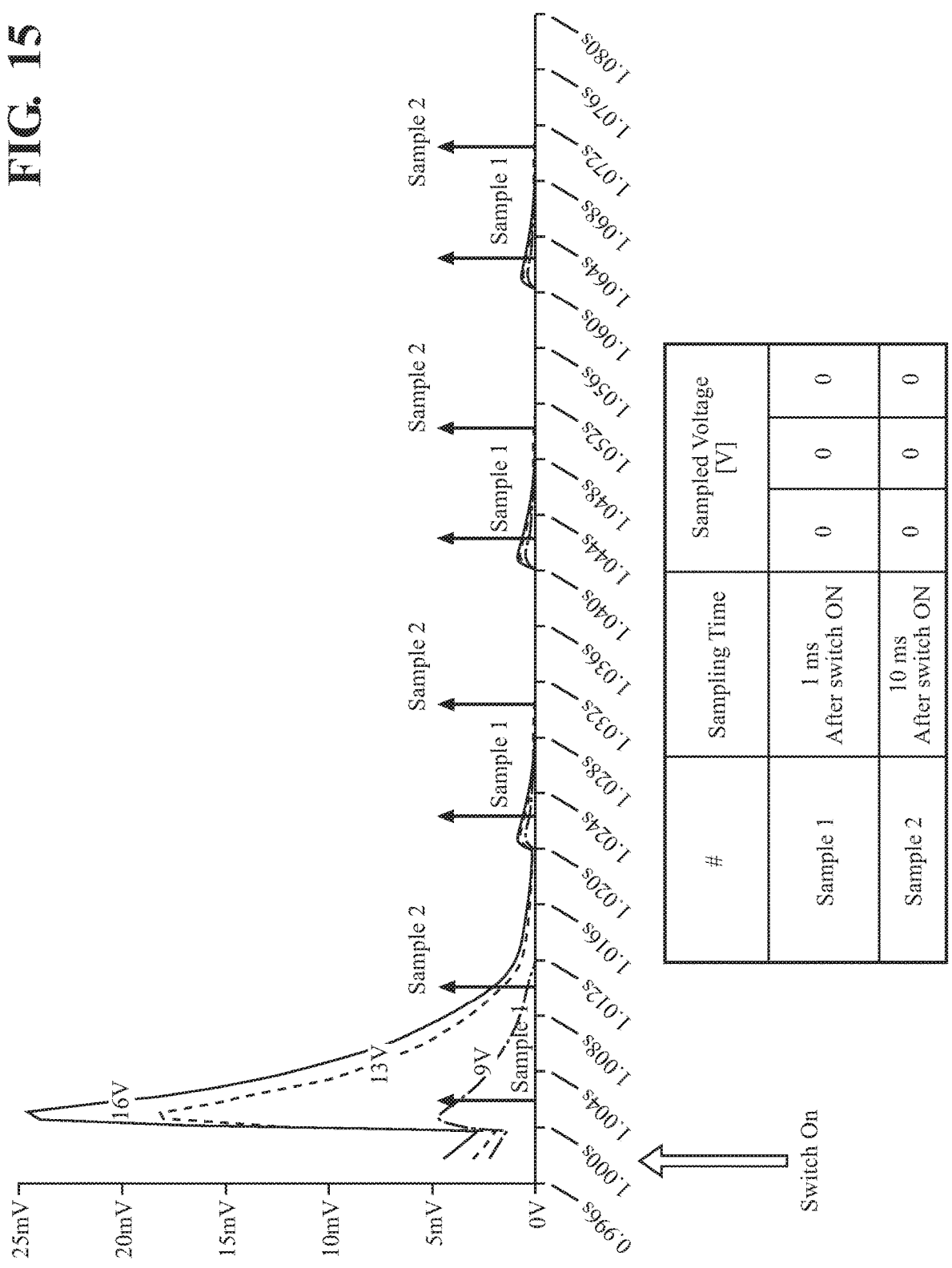
FIG. 15 is a plot of the output voltage waveform input to the control unit of the electronic control circuit of FIG. 2 illustrating the output voltage waveform with the normally open pin broken (i.e., open circuit)

The step of determining a position of a handle switch 70 can also include the step of 234 determining the handle switch 70 is open and a fault of a common node 38 shorted to battery is present in response to the first sample and the second sample both being a second defined constant voltage, 4 V for example (FIG. 10). Likewise, 236 determining the handle switch 70 is open and a fault of a normally open node 36 shorted to the common node 38 is present in response to the first sample and the second sample both being a third defined constant voltage, 2.8 V for example (FIG. 14). As mentioned above, the handle resistor 74 provides a voltage drop to help distinguish between faults. Specifically, the handle resistor 74 helps distinguish between the fault of a normally open node 36 shorted to the common node 38 (FIG. 14) and normal operation of the handle switch 70 being moved to the closed position with no faults (FIG. 9). In detail, when the handle 15 is pulled, current goes through the handle resistor 74 causing a voltage drop, as compared to a short circuit across the normally open node 36 and the common node 38. In the latter case, the short is before the handle resistor 74, therefore, there would be no voltage drop across the handle resistor 74 and the control unit 21 can therefore make a distinction between the two situations.

Figure 16:
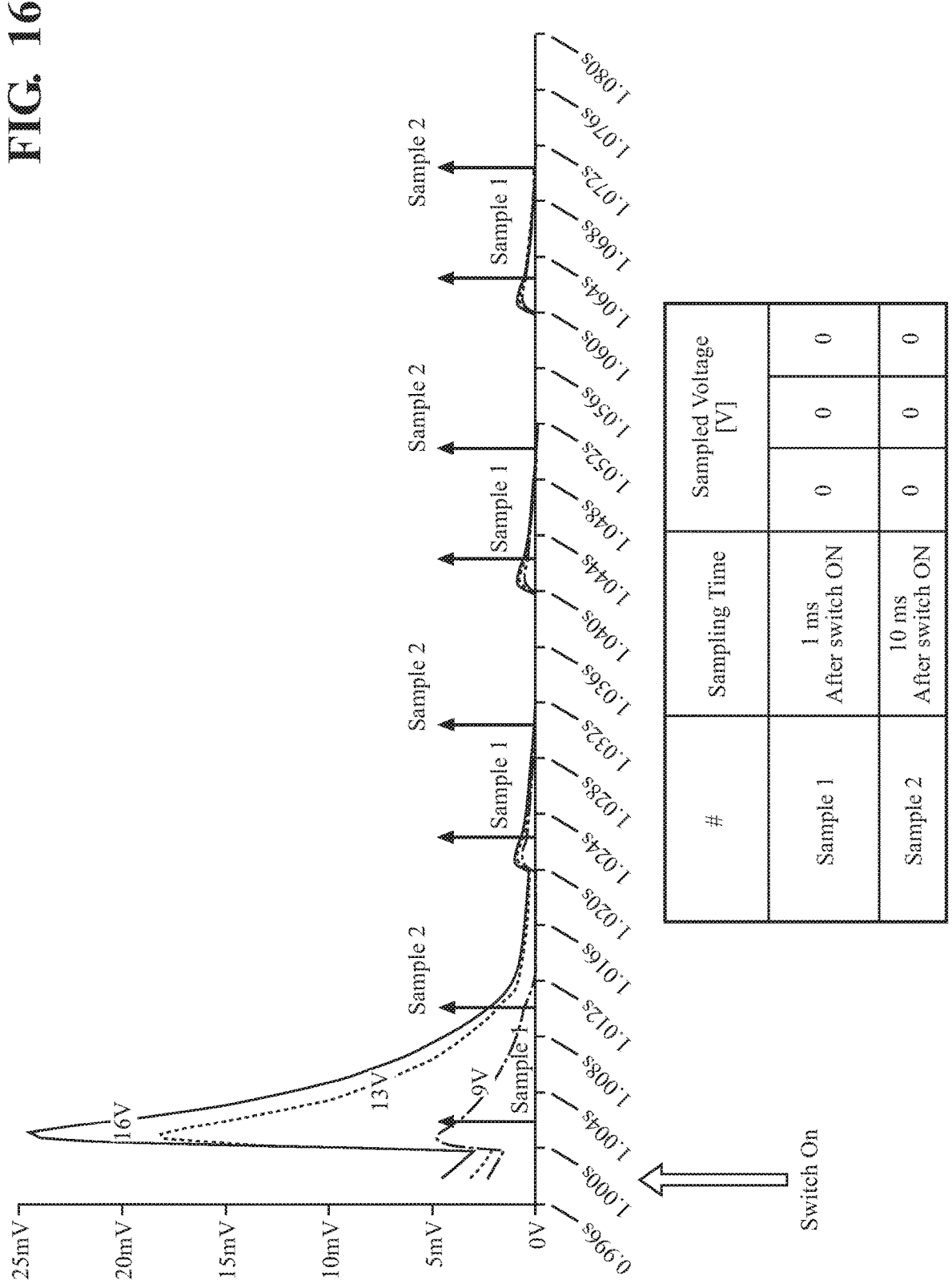
FIG. 16 is a plot of the output voltage waveform input to the control unit of the electronic control circuit of FIG. 2 illustrating the output voltage waveform with an external capacitor broken (i.e., short circuit)

The method can also include the step of 238 determining the handle switch 70 is open and a fault of a handle capacitor 72 shorted is present in response to the first sample and the second sample both being a fourth defined constant voltage, 1.6V for example (FIG. 16). The method can additionally include the step of 240 determining the handle switch 70 is open and at least one fault is present in response to the first sample and the second sample both being zero volts (FIGS. 11, 12, 13, and 15). In each of FIGS. 8-16, the indication of "Switch On" that is shown corresponds with the moment when reading/diagnostics begins (i.e., activation of the first power switch 44).

The advantages of the discussed solution are clear from the foregoing description. In particular, an increase in safety may be achieved, during normal operation of the e-latch assembly 1 as well as after a crash or any other kind of emergency situation as a result of the improved capabilities of the handle switch reading circuit 22 (i.e., ability to detect fault conditions). Specifically, the handle switch reading circuit 22 for coupling with the handle switch subassembly 16 as disclosed herein is capable of detecting all possible dangerous faults. As illustrated in FIG. 17, the present the handle switch reading circuit 22 and method steps discussed above improve upon latch assemblies, including those that may use three pin handle switches, for example. Such detection of faults in the handle switch reading circuit 22 and/or the handle switch subassembly 16 is important in preventing unwanted door opening (e.g., spontaneous release of the e-latch assembly 1) and user entrapment (e.g., movement of handle 15 is not properly detected).

Clearly, changes may be made to what is described and illustrated herein without, however, departing from the scope defined in the accompanying claims. The e-latch assembly 1 may operate any kind of different closure devices within the motor vehicle 3, for example. In general, the handle switch reading circuit 22 may be used also for other purposes, within the motor vehicle 3, or for different automotive applications (i.e., the handle switch reading circuit 22 is applicable to any type of switch that includes an internal capacitor and a resistor).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. An electronic control circuit comprising:
   a control unit including a computing module and a memory for communicating with a plurality of sensors and connecting to a main power source; and a switch reading circuit connected to and controlled by said control unit and connected to the main power source and having a normally open node and common node for coupling with a handle switch subassembly having a switch being user activatable for connecting said normally open node and said common node and a capacitor in parallel with the switch, said switch reading circuit adapted to supply an AC voltage to the handle switch subassembly, produce an output voltage waveform at the common node corresponding to the charging and discharging of the capacitor and in response to the switch being operated, and determine a position of the switch and presence of faults in said switch reading circuit and the handle switch subassembly based on the output voltage waveform.

2. An electronic control circuit as set forth in claim 1, wherein said switch reading circuit is a handle switch reading circuit for use in a vehicular closure system, and wherein the capacitor is a handle capacitor and the switch is a handle switch.

3. An electronic control circuit as set forth in claim 2, wherein said handle switch reading circuit includes a DC-to-AC converter for converting a DC voltage from the main power source to the AC voltage supplied to the handle switch subassembly.

4. An electronic control circuit as set forth in claim 2 further including a backup energy source electrically coupled to said control unit and to said handle switch reading circuit for providing electrical energy in response to one of a failure and interruption of the main power source.

5. An electronic control circuit as set forth in claim 2, wherein the AC voltage is applied across the handle switch.

6. A switch reading circuit for an e-latch assembly comprising:
at least one input node and an output node for connection to a control unit and a main power node for connection to a main power source and a ground node for connection to a ground and a normally open node and a common node for connection to a handle switch subassembly;
a DC-to-AC converter connected to one of said at least one input node and said main power node and including a converter output node for converting a DC voltage from the main power source to an AC voltage output at said converter output node;
a series capacitor connected between said common node and said ground node; and
said common node coupled to said output node for providing an output waveform to the control unit at said output node to determine a position of a switch of the handle switch subassembly being user activatable and any faults present in said switch reading circuit.

7. A switch reading circuit as set forth in claim 6, wherein said at least one input node includes a first input node and a second input node and said DC-to-AC converter includes a first power switch having a first base connected to said first input node and a first emitter connected said ground node and a first collector and a second power switch having a second base connected to said first collector and a second emitter connected to said main power node and a second collector and a converter resistor connected to said second collector.

8. A switch reading circuit as set forth in claim 7, wherein said DC-to-AC converter includes a double diode including a first diode connected between said backup power node and said converter output node for preventing current flow to said backup power node from said converter output node and a second diode connected between said converter resistor and said converter output node for rectifying the AC voltage and preventing current flow to said second collector from said converter output node.

9. A switch reading circuit as set forth in claim 6, further including a converter-to-switch resistor connected between said converter output node and said normally open node for providing a voltage drop.

10. A switch reading circuit as set forth in claim 6, further including a series capacitor connected between said common node and said ground node.

11. A switch reading circuit as set forth in claim 6, further including a voltage divider subcircuit coupled to said common node and to said output node for decreasing a common node output voltage from said common node.

12. A switch reading circuit as set forth in claim 11, further including an output diode connected between said common node and said voltage divider subcircuit for preventing current flow from said output node to said common node.

13. A switch reading circuit as set forth in claim 6, wherein said at least one input node includes a first input node and a second input node and said switch reading circuit further includes a grounding switch having a first source connected to said ground node and a first gate connected to said second input node and a first drain coupled to said common node.

14. A method of operating a switch reading circuit comprising the steps of:
generating an AC voltage from a DC voltage;
supplying the AC voltage to a handle switch subassembly;
producing an output voltage waveform corresponding to the charging and discharging of a capacitor of the handle switch subassembly and in response to a switch being user activatable of the handle switch subassembly being operated;
sampling the output voltage waveform using a control unit; and
determining a position of the switch of the handle switch subassembly and any faults present in the switch reading circuit based on the sampling of the output voltage waveform.

15. A method as set forth in claim 14, wherein the step of generating an AC voltage from a DC voltage includes:
providing the DC voltage to a DC-to-AC converter from a main power source;
switching a first power switch and a second power switch using a control unit; and
generating an AC voltage from the DC voltage in response to the switching of the first power switch and the second power switch of the DC-to-AC converter.

16. A method as set forth in claim 15, further including the step of rectifying the AC voltage with a diode to produce a rectified AC voltage and wherein the step of supplying the AC voltage to the handle switch subassembly is further defined as supplying the rectified AC voltage to the handle switch subassembly.

17. A method as set forth in claim 16, wherein the step of producing an output voltage waveform corresponding to the charging and discharging of the capacitor of the handle switch subassembly and in response to the switch of the handle switch subassembly being operated includes:
charging the capacitor of the handle switch subassembly with the rectified AC voltage in response to the rectified AC voltage being positive; and discharging the capacitor of the handle switch subassembly with the rectified AC voltage in response to the rectified AC voltage being zero.

18. A method as set forth in claim 14, wherein the step of sampling the output voltage waveform using a control unit includes:
  sampling a first sample of the output voltage waveform at an output node after a first predetermined time period using the control unit; and
  sampling a second sample of the output voltage waveform at the output node after a second predetermined time period being longer than the first predetermined time period using the control unit.

19. A method as set forth in claim 18, wherein a step of determining a state of the switch of the handle switch subassembly and any faults present in the switch reading circuit based on the sampling of the output voltage waveform includes:
  comparing the first sample to the second sample;
  determining the switch is open and no faults are present in response to the first sample being a higher voltage as compared to the second sample;
  determining the switch is closed and no faults are present in response to the first sample and the second sample being a first defined constant voltage;
  determining the switch is open and a fault of a common node shorted to battery is present in response to the first sample and the second sample both being a second defined constant voltage;
  determining the switch is open and a fault of a normally open node shorted to the common node is present in response to the first sample and the second sample both being a third defined constant voltage;
  determining the switch is open and a fault of the capacitor shorted is present in response to the first sample and the second sample both being a fourth defined constant voltage; and
  determining the switch is open and at least one fault is present in response to the first sample and the second sample both being zero volts.

20. A method as set forth in claim 14, further including the step of turning on a grounding switch.

\* \* \* \* \*